US008441473B2

(12) United States Patent
Han et al.

(10) Patent No.: US 8,441,473 B2

(45) Date of Patent: May 14, 2013

(54) METHOD FOR REMOVING OFFSET BETWEEN CHANNELS OF LCD PANEL

(75) Inventors: Dae-Keun Han, Daejeon-si (KR); Dae-Seong Kim, Daejeon-si (KR); Hyung-Seog Oh, Cheongju-si (KR); Joon-Ho Na, Daejeon-si (KR); Hyun-Ho Cho, Incheon-si (KR)

(73) Assignee: Silicon Works Co., Ltd., Daejeon-si (KR)

( * ) Notice: Subject to any disclaimer, the term of this patent is extended or adjusted under 35 U.S.C. 154(b) by 758 days.

(21) Appl. No.: 12/593,102

(22) PCT Filed: Mar. 17, 2008

(86) PCT No.: PCT/KR2008/001441

§ 371 (c)(1), (2), (4) Date: Sep. 25, 2009

(87) PCT Pub. No.: WO2008/133405

PCT Pub. Date: Nov. 6, 2008

(65) Prior Publication Data

US 2010/0118024 A1 May 13, 2010

(30) Foreign Application Priority Data

Apr. 27, 2007 (KR) ........................ 10-2007-0041196

(51) Int. Cl.
*G06F 3/038* (2006.01)

(52) U.S. Cl.
USPC ................. 345/214; 345/38; 345/52; 345/96; 345/87; 345/79

(58) Field of Classification Search ........................ None
See application file for complete search history.

(56) References Cited

U.S. PATENT DOCUMENTS

| | | | | |
|---|---|---|---|---|
| 6,069,605 | A | 5/2000 | Ozawa | |
| 7,079,160 | B2 * | 7/2006 | Colavin | 345/684 |
| 2002/0163488 | A1 | 11/2002 | Song et al. | |
| 2005/0219190 | A1 | 10/2005 | Lee et al. | |
| 2006/0226899 | A1 | 10/2006 | Kasai et al. | |
| 2007/0085608 | A1 | 4/2007 | Iriguchi et al. | |

FOREIGN PATENT DOCUMENTS

| | | |
|---|---|---|
| JP | 11-249623 | 9/1999 |
| JP | 11-249623 A | 9/1999 |
| JP | 11-249624 | 9/1999 |
| JP | 11-249624 A | 9/1999 |

(Continued)

OTHER PUBLICATIONS

PCT International Search Report of Int'l Application No. PCT/KR2008/001441 filed on Mar. 17, 2008.

(Continued)

*Primary Examiner* — Muhammad N Edun

(74) *Attorney, Agent, or Firm* — Kile Park Reed & Houtteman PLLC

(57) ABSTRACT

A method of removing offsets between channels of a liquid crystal panel is provided. The method includes: alternately arranging first type output buffers and second type output buffers for driving the pixels in units of at least two rows of the pixels; and arranging the first type output buffers and the second type output buffers in units of at least two columns of the pixels so that the output buffers with types opposite to those of previous two columns are arranged. The second type output buffers are embodied by switching connections among the differential transistors and connections among the load transistors in the first type output buffers.

22 Claims, 13 Drawing Sheets

Vertical 1-Dot Inversion

FOREIGN PATENT DOCUMENTS

| | | | |
|---|---|---|---|
| JP | 2001-343948 | | 12/2001 |
| JP | 2001-343948 | A | 12/2001 |
| JP | 2002-62852 | | 2/2002 |
| JP | 2002-062852 | A | 2/2002 |
| JP | 2004-310033 | | 11/2004 |
| JP | 2004-310033 | A | 11/2004 |
| TW | I363323 | | 5/2012 |

OTHER PUBLICATIONS

PCT Written Opinion of the Int'l Search Authority for Int'l Application No. PCT/KR2008/001441 filed on Mar. 17, 2008.

* cited by examiner

Vertical 2-Dot Inversion

Horizontal 2-Dot Inversion

Square Inversion

Vertical 1-Dot Inversion

Vertical 1-Dot Inversion

Vertical 2-Dot Inversion

Vertical 2-Dot Inversion

Horizontal 2-Dot Inversion

Horizontal 2-Dot Inversion

Square Inversion

Square Inversion

METHOD FOR REMOVING OFFSET BETWEEN CHANNELS OF LCD PANEL

BACKGROUND OF THE INVENTION

1. Field of the Invention

The present invention relates to a liquid crystal display (LCD) device, and more particularly, to a method of horizontally and vertically removing offsets generated between channels at the same time.

2. Description of the Related Art

In general, an LCD device is constructed with a liquid crystal panel unit and a driving unit. The liquid crystal panel unit is constructed with a lower glass substrate in which pixel electrodes and thin film transistors are arranged in a matrix form, an upper glass substrate constructed with common electrodes and a color filter layer, and a liquid crystal layer inserted between the upper and lower glass substrates. The driving unit includes an image signal processing unit for processing an image signal that is externally input and outputting a composite synchronization signal, a control unit for receiving the composite synchronization signal that is output from the image signal processing unit, separately outputting a horizontal synchronization signal and a vertical synchronization signal, and controlling timing according to a mode selection signal, and gate and source drivers for sequentially applying a driving voltage to scan lines and signal lines of the liquid crystal panel unit in response to an output signal of the control unit.

In the LCD device, voltages applied to pixels s required to be inverted. When electric field with single polarity is applied for a long time, deterioration of a liquid crystal material or oriented layer or parasitic charge due to impurities occurs. Accordingly, this operation is performed so as to prevent deterioration in display quality such as image persistence.

In order to prevent deterioration of pixels, polarities of pixels have to be inverted for each frame. Flickers of the liquid crystal panel occur due to a small difference in luminance between polarities. Driving methods such as a row inversion driving method, a column inversion driving method, a dot inversion driving method, and the like are used to reduce the flickers. In the row inversion driving method, the pixels are driven so that neighboring gate lines are inversely displayed with respect to each other in negative and positive polarity combination of the liquid crystal. In the column inversion driving method, the pixels are driven so that neighboring data lines are inversely displayed with respect to each other. In the dot inversion driving method obtained by combining the row inversion driving method with the column inversion driving method, the pixels are driven so that neighboring pixels surrounding a pixel are inversely displayed with respect to the pixel.

These methods are used to reduce differences in luminance between pixels in a predetermined area by using a fact that human eyes concurrently recognize a plurality of pixels. In general, it is known that the dot inversion driving method is the most valid method that is convenient for a user. The dot inversion driving method is most widely used as an inversion driving method of the LCD device.

On the other hand, in the LCD device, since offsets between channels of the source drivers of the LCD device are important in characteristics of the LCD device, a method for reducing the offsets is actively developed. A cause of the offsets between channels of the source drivers exists in output buffers of the source drivers.

FIGS. 1 and 2 illustrate an output buffer used for a conventional method of removing offsets. Referring to FIG. 1, an output buffer 10 includes a first NMOS transistor M1 including a gate connected to a first input signal IN and a second NMOS transistor M2 including a gate connected to a second input signal INB. A first PMOS transistor M3 is connected between a source voltage VDD and the first NMOS transistor M1. A second PMOS M4 is connected between a source voltage VDD and the second NMOS transistors M2. Gates of the first and second PMOS transistors M3 and M4 are connected to a drain of the second PMOS transistor M4 so as to construct a current mirror. A third NMOS transistor M5 including a gate connected to a bias signal BIAS is connected between the first and second NMOS transistors M1 and M2 and a ground voltage VSS. The output buffer 10 further includes third and fourth NMOS transistors M6 and M7 which are serially connected between the source voltage VDD and the ground voltage VSS. A gate of the third PMOS transistor M6 is connected to a drain of the first NMOS transistor M1 and a drain of the first PMOS transistor M3. A gate of the fourth NMOS transistor is connected to the bias signal BIAS. A drain of the third PMOS transistor M6 and a drain of the fourth NMOS transistor M7 output an output signal.

Offsets of the output buffer 10 is caused by a mismatch of the first and second NMOS transistors M1 and M2 which are differential pair transistors and a mismatch of the first and second PMOS transistors M3 and M4 which are active load transistors. Mismatches of the aforementioned transistors M1 to M4 are caused in a procedure of fabricating the transistors included in the process of fabricating a semiconductor device. The offsets are direct current (DC) offsets. The offsets arbitrarily occur.

When the offsets occur, an input level of the output buffer 10 is different from an output level, thereby causing a brightness difference of the liquid crystal panel. The first type output buffer 10 of FIG. 1 and a second type output buffer 20 of FIG. 2 are used to compensate the brightness difference. In FIG. 1, the first type output buffer 10 in which the second input signal INB and the output signal OUT are connected to each other is embodied. The first type output buffer 10 has a positive offset. In FIG. 2, the second type output buffer 20 is illustrated. In the second type output buffer 20, a second input signal INB is connected to a gate of a first NMOS transistor M1. A first input signal IN is connected to a gate of a second NMOS transistor M2. Gates of first and second PMOS transistors M3 and M4 which constitute a current mirror are connected to a drain of the first PMOS transistor M3. A gate of the third PMOS transistor M6 is connected to a drain of the second PMOS transistor M4. The second type output buffer 20 has a negative offset.

If the differential pair transistors M1 and M2 and the active load transistors M3 and M4 are alternately switched by using the first type output buffer 10 and the second type output buffer 20, as shown in FIG. 3, when the input signal IN is about 5 V, the output signal OUT of the first output buffer 10 is about 5.1 V. When the output signal OUT of the second output buffer 20 is about 4.9 V, the output signal OUT of the second output buffer 20 is about 4.9 V. Accordingly, the mean output signal OUT is about 5.0 V that is a mean value in which positive and negative offsets are compensated. Thus, a brightness difference of the liquid crystal panel disappears.

FIG. 4 illustrates a conventional method of removing offsets in a vertical 1-dot inversion driving method. Referring to FIG. 4, output lines of a source driver are denoted by S1 to S6. Gate lines of a gate driver are denoted by G1 to G4. For the convenience of indication, the first type output buffer 10 is denoted by A, and the second type output buffer 20 is denoted by B. In the vertical 1-dot inversion driving method, the first type output buffer 10 and the second type output buffer 20 are alternately arranged in units of two rows. Accordingly, the offsets are vertically removed. However, the offsets are not horizontally compensated. A horizontal two-line dim phenomenon in which two lines are bright and two lines are dark occurs. In order to prevent the horizontal two-line dim phenomenon, the first and second type output buffers 10 and 20 are changed each other in units of a frame. If the offsets are large, the entire screen may be flickered.

FIG. 5 illustrates a conventional method of removing offsets in a vertical 2-dot inversion driving method. Referring to FIG. 5, in the vertical 2-dot inversion driving method, the first and second type output buffers 10 and 20 are alternately arranged in units of a row. Accordingly, the offsets are vertically removed. However, the offsets are not horizontally compensated. A horizontal one-line dim phenomenon in which a line is bright and a line is dark occurs. In order to prevent the horizontal one-line dim phenomenon, the first and second type output buffers 10 and 20 are changed each other in units of a frame. If the offsets are large, the entire screen may be flickered.

FIG. 6 illustrates a conventional method of removing offsets in a horizontal 2-dot inversion driving method. Referring to FIG. 6, in the horizontal 2-dot inversion driving method, the first and second type output buffers 10 and 20 are alternately arranged in units of two rows. Accordingly, the offsets are vertically removed. However, the offsets are not horizontally compensated. A horizontal two-line dim phenomenon in which two lines are bright and two lines are dark occurs. In order to prevent the horizontal two-line dim phenomenon, the first and second type output buffers 10 and 20 are changed each other in units of a frame. If the offsets are large, the entire screen may be flickered.

FIG. 7 illustrates a conventional method of removing offsets in a square inversion driving method. Referring to FIG. 7, in the square inversion driving method obtained by combining the horizontal 2-dot inversion driving method with the vertical 2-dot inversion driving method, the first and second type output buffers 10 and 20 are alternately arranged in units of two rows. Accordingly, the offsets are vertically removed. However, the offsets are not horizontally compensated. A horizontal one-line dim phenomenon in which a line is bright and a line is dark occurs. In order to prevent the one-line dim phenomenon, the first and second type output buffers 10 and 20 are changed with each other in units of a frame. If the offsets are large, the entire screen may be flickered.

In the methods of removing the offsets of FIGS. 4 to 7, the offsets are vertically removed, but the offsets are not horizontally removed.

SUMMARY OF THE INVENTION

The present invention provides a method of horizontally and vertically removing offsets between channels at the same time.

According to an aspect of the present invention, there is provided a method of removing offsets between channels of a liquid crystal panel including pixels arranged in rows and columns, the method comprising: alternately arranging first type output buffers and second type output buffers for driving the pixels in units of at least two rows of the pixels; and arranging the first type output buffers and the second type output buffers in units of at least two columns of the pixels so that the output buffers with types opposite to those of previous two columns are arranged.

In the above aspect of the present invention, the first and second type output buffers may be constructed with differential transistors that constitute a symmetrical structure and load transistors connected to the differential transistors, and the second type output buffers may be embodied by switching connections among the differential transistors and connections among the load transistors in the first type output buffers.

In addition, the liquid crystal panel may be driven in a vertical 1-dot inversion driving method so that a vertically neighboring pixel is displayed with inverse polarity.

In addition, the liquid crystal panel may be driven in a vertical 2-dot inversion driving method so that two vertically neighboring pixels are displayed with inverse polarity.

In addition, the liquid crystal panel may be driven in a horizontal 2-dot inversion driving method so that two horizontally neighboring pixels are displayed with inverse polarity.

In addition, the liquid crystal panel may be driven in a square inversion driving method so that a neighboring group including horizontally neighboring two pixels and vertically neighboring two pixels is displayed with inverse polarity.

According to another aspect of the present invention, there is provided a method of removing offsets between channels of a liquid crystal panel including pixels arranged in rows and columns, the method comprising: alternately arranging first type output buffers and second type output buffers for driving the pixels in units of at least two rows of the pixels; and arranging the first type output buffers and the second type output buffers in units of a column of the pixels so that the output buffers with types opposite to those of previous two columns are arranged.

According to another aspect of the present invention, there is provided a method of removing offsets between channels of a liquid crystal panel including pixels arranged in rows and columns, the method comprising: alternately arranging first type output buffers and second type output buffers for driving the pixels in units of a row of the pixels; and arranging the first type output buffers and the second type output buffers in units of at least two columns of the pixels so that the output buffers with types opposite to those of previous two columns are arranged.

According to another aspect of the present invention, there is provided a method of removing offsets between channels of a liquid crystal panel including pixels arranged in rows and columns, the method comprising: alternately arranging first type output buffers and second type output buffers for driving the pixels in units of a row of the pixels; and arranging the first type output buffers and the second type output buffers in units of a column of the pixels so that the output buffers with types opposite to those of a previous column are arranged.

Accordingly, it is possible to horizontally and vertically compensate offsets between channels at the same time through a method of arranging output buffers according to the method for removing the offsets.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
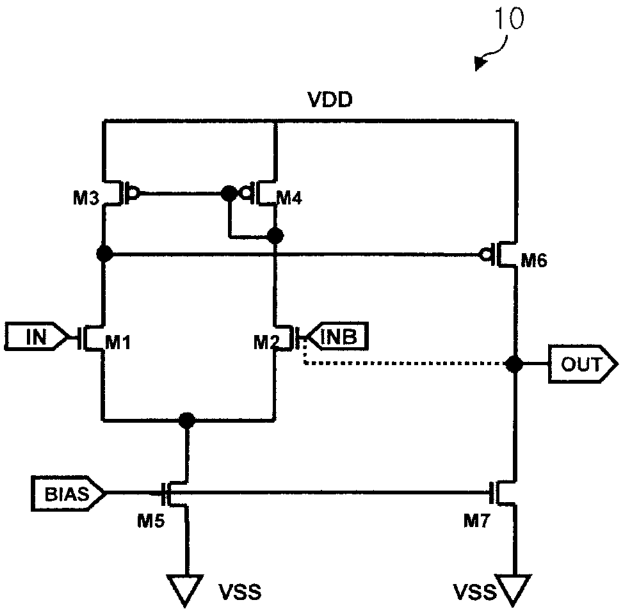
FIGS. 1 and 2 illustrate an output buffer used for a conventional method of removing offsets.

The attached drawings for illustrating exemplary embodiments of the present invention are referred to in order to gain a sufficient understanding of the present invention, the merits thereof, and the objectives accomplished by the implementation of the present invention.

Hereinafter, the present invention will be described in detail by explaining exemplary embodiments of the invention with reference to the attached drawings. Like reference numerals in the drawings denote like elements.

Figure 2:
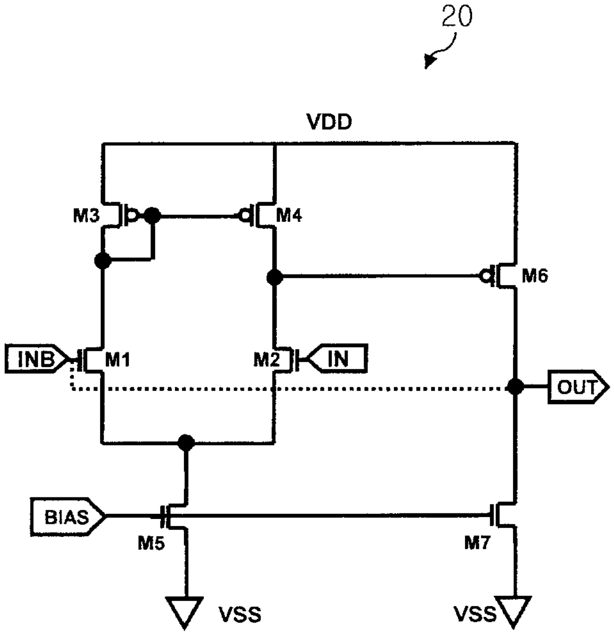
Figure 3:
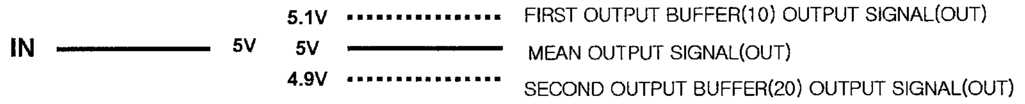
FIG. 3 illustrates characteristics of output buffers of FIGS. 1 and 2.
Figure 4:
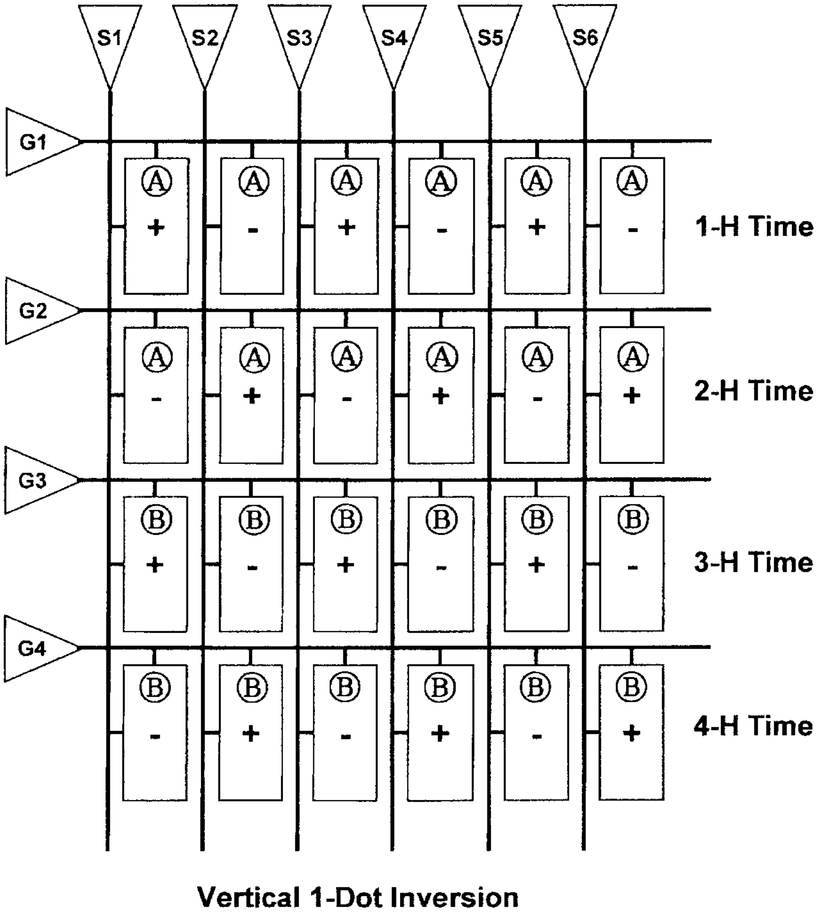
FIGS. 4 to 7 illustrate conventional methods of removing offsets.
Figure 5:
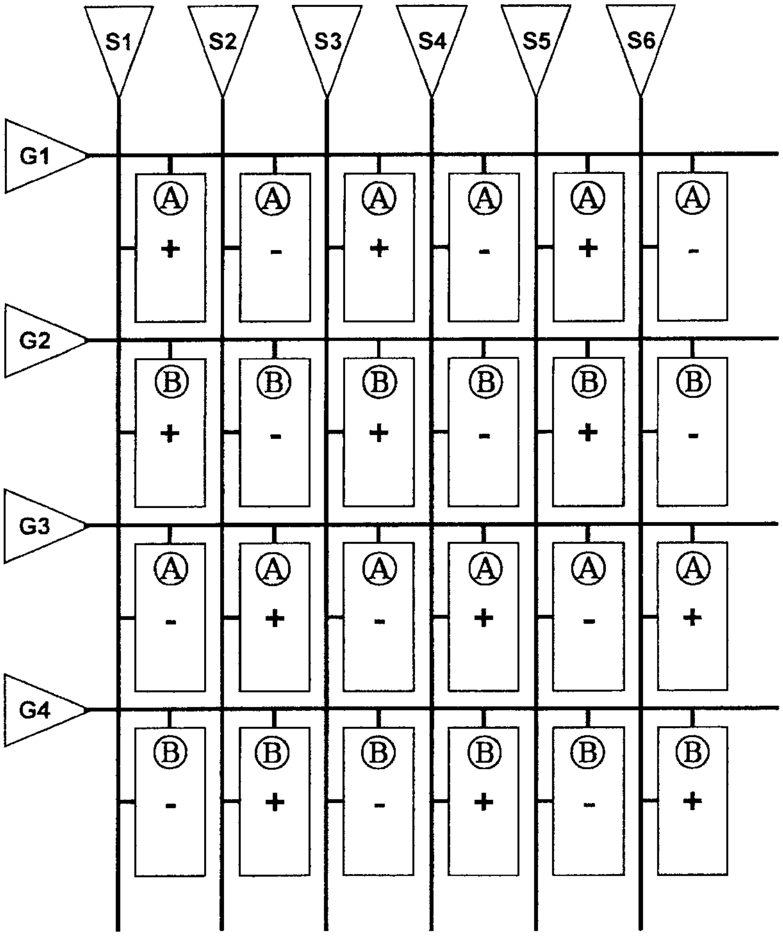
Figure 6:
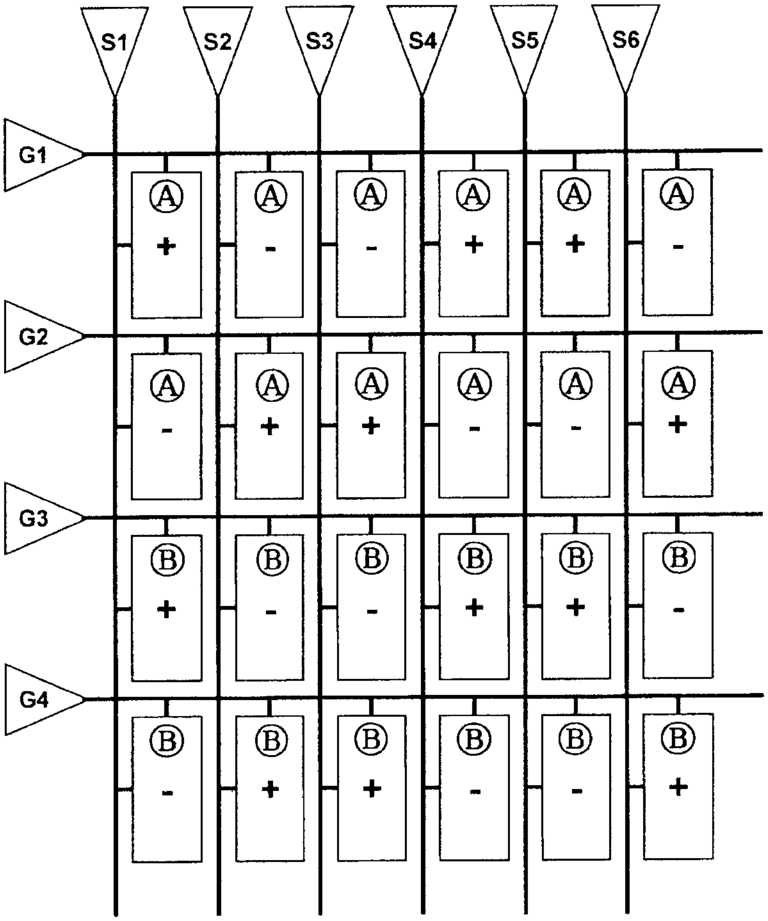
Figure 7:
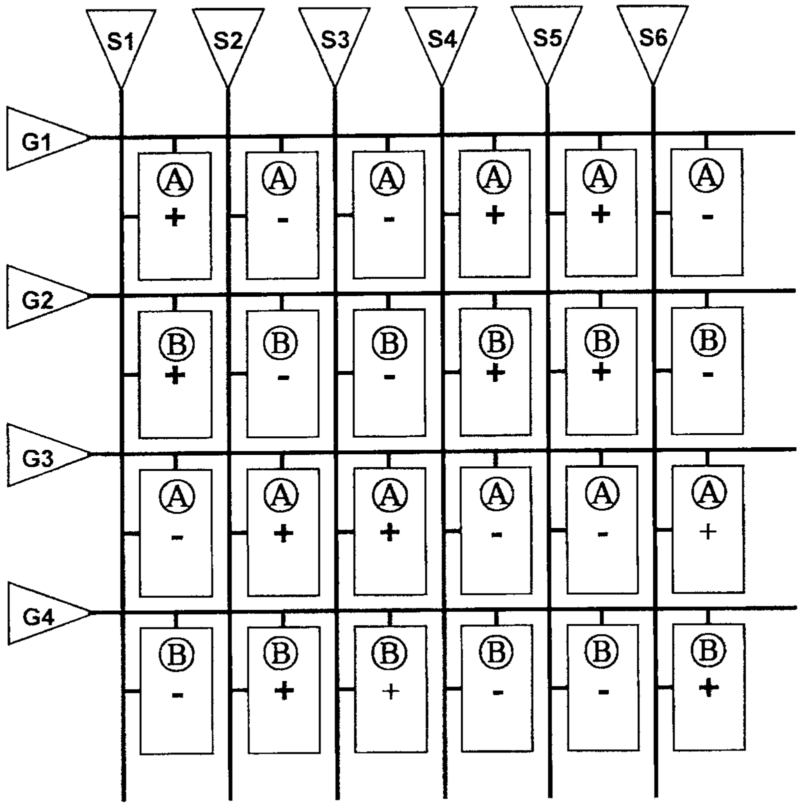
Figure 8:
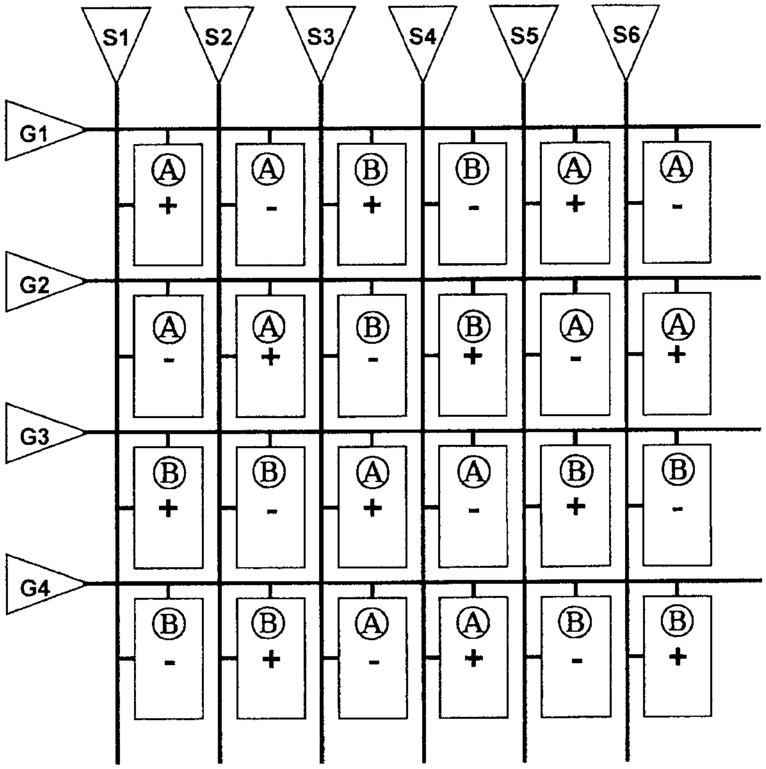
FIG. 8 illustrates a method of removing offsets in a vertical 1-dot inversion driving method according to a first embodiment of the present invention.

FIG. 8 illustrates a method of removing offsets in a vertical 1-dot inversion driving method according to a first embodiment of the present invention. Referring to FIG. 8, output lines of a source driver are denoted by S1 to S6, and gate lines of a gate driver are denoted by G1 to G4. For the convenience of indication, the first type output buffer 10 of FIG. 1 is denoted by A, and the second type output buffer 20 of FIG. 2 is denoted by B. Pixels are arranged at crossing points of the output lines S1 to S6 and the gate lines G1 to G4 to form a matrix structure of rows and columns.

In a vertical 1-dot inversion driving method, in first and second rows, a first type output buffer (10, A), a first type output buffer (10, A), a second type output buffer (20, B), a second type output buffer (20, B), a first type output buffer (10, A), and a first type output buffer (10, A) are sequentially arranged. In third and fourth rows, a second type output buffer (20, B), a second type output buffer (20, B), a first type output buffer (10, A), a first type output buffer (10, A), a second type output buffer (20, B), and a second type output buffer (20, B) are sequentially arranged. Similarly to the first and second rows, in fifth and sixth rows (not shown), a first type output buffer (10, A), a first type output buffer (10, A), a second type output buffer (20, B), a second type output buffer (20, B), a first type output buffer (10, A), and a first type output buffer (10, A) are sequentially arranged.

That is, in the vertical 1-dot inversion driving method, first type output buffers (10, A) and second type output buffers (20, B) are alternately arranged in units of two rows. The first type output buffers (10, A) and the second type output buffers (20, B) are alternately arranged in units of two columns so that output buffers having types opposite to those of previous two columns are arranged.

Figure 9:
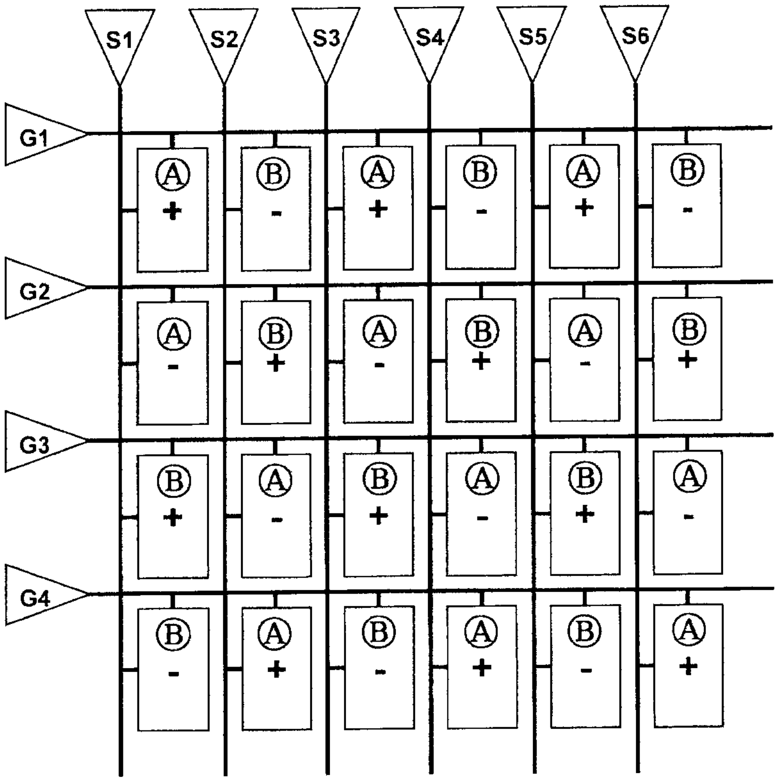
FIG. 9 illustrates a method of removing offsets in a vertical 1-dot inversion driving method according to a second embodiment of the present invention.

FIG. 9 illustrates a method of removing offsets in a vertical 1-dot inversion driving method according to a second embodiment of the present invention. Referring to FIG. 9, in the vertical 1-dot inversion driving method, in first and second rows, a first type output buffer (10, A), a second type output buffer (20, B), a first type output buffer (10, A), a second type output buffer (20, B), a first type output buffer (10, A), and a second type output buffer (20, B) are sequentially arranged. In third and fourth rows, a second type output buffer (20, B), a first type output buffer (10, A), a second type output buffer (20, B), a first type output buffer (10, A), a second type output buffer (20, B), and a first type output buffer (10, A) are sequentially arranged. Similarly to the first and second rows, in fifth and sixth rows (not shown), a first type output buffer (10, A), a second type output buffer (20, B), a first type output buffer (10, A), a second type output buffer (20, B), a first type output buffer (10, A), and a second type output buffer (20, B) are sequentially arranged.

That is, in the vertical 1-dot inversion driving method, first type output buffers (10, A) and second type output buffers (20, B) are alternately arranged in units of two rows. The first type output buffers (10, A) and the second type output buffers (20, B) are arranged in units of a column so that output buffers with types opposite to those of a previous column are arranged.

Figure 10:
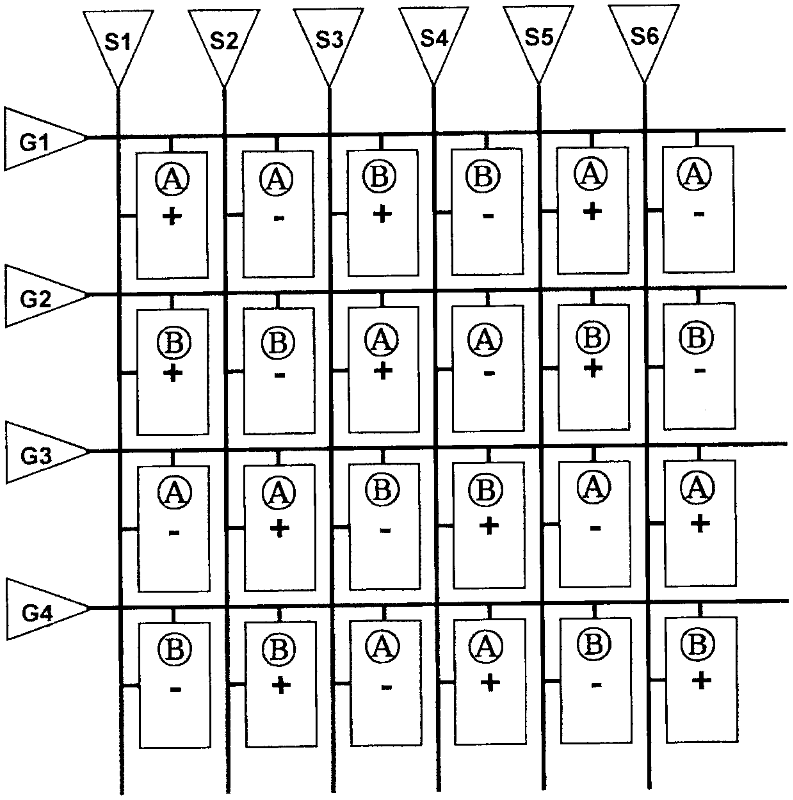
FIG. 10 illustrates a method of removing offsets in a vertical 2-dot inversion driving method according to a third embodiment of the present invention.

FIG. 10 illustrates a method of removing offsets in a vertical 2-dot inversion driving method according to a third embodiment of the present invention. Referring to FIG. 10, in the vertical 2-dot inversion driving method, in first and third rows, a first type output buffer (10, A), a first type output buffer (10, A), a second type output buffer (20, B), a second type output buffer (20, B), a first type output buffer (10, A), and a first type output buffer (10, A) are sequentially arranged. In second and fourth rows, a second type output buffer (20, B), a second type output buffer (20, B), a first type output buffer (10, A), a first type output buffer (10, A), a second type output buffer (20, B), and a second type output buffer (20, B) are sequentially arranged. Similarly to the first row, in a fifth row (not shown), a first type output buffer (10, A), a first type output buffer (10, A), a second type output buffer (20, B), a second type output buffer (20, B), a first type output buffer (10, A), and a first type output buffer (10, A) are sequentially arranged. Similarly to the second row, in a sixth row (not shown), a second type output buffer (20, B), a second type output buffer (20, B), a first type output buffer (10, A), a first type output buffer (10, A), a second type output buffer (20, B), and a second type output buffer (20, B) are sequentially arranged.

That is, in the vertical 2-dot inversion driving method, first type output buffers (10, A) and second type output buffers (20, B) are alternately arranged in units of a row. The first type output buffers (10, A) and the second type output buffers (20, B) are alternately arranged in units of two columns so that output buffers with types opposite to those of previous two columns are arranged.

Figure 11:
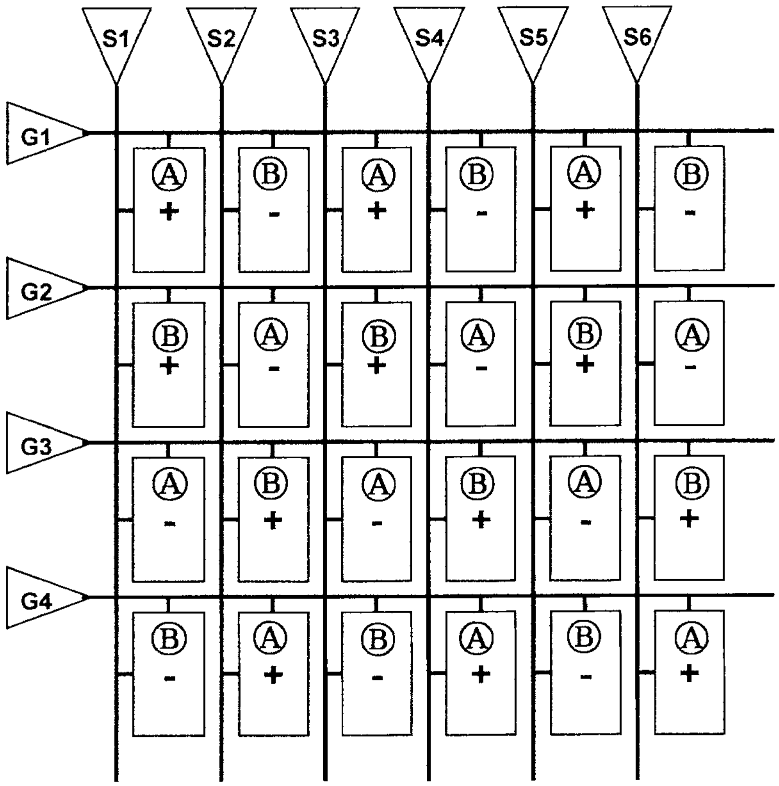
FIG. 11 illustrates a method of removing offsets in a vertical 2-dot inversion driving method according to a fourth embodiment of the present invention.

FIG. 11 illustrates a method of removing offsets in a vertical 2-dot inversion driving method according to a fourth embodiment of the present invention. Referring to FIG. 11, in the vertical 2-dot driving method, in first and third rows, a first type output buffer (10, A), a second type output buffer (20, B), a first type output buffer (10, A), a second type output buffer (20, B), a first type output buffer (10, A), and a second type output buffer (20, B) are sequentially arranged. In second and fourth rows, a second type output buffer (20, B), a first type output buffer (10, A), a second type output buffer (20, B), a first type output buffer (10, A), a second type output buffer (20, B), and a first type output buffer (10, A) are sequentially arranged. Similarly to the first row, in a fifth row (not shown), a first type output buffer (10, A), a second type output buffer (20, B), a first type output buffer (10, A), a second type output buffer (20, B), a first type output buffer (10, A), and a second type output buffer (20, B) are sequentially arranged. Similarly to the second row, in a sixth row (not shown), a second type output buffer (20, B), a first type output buffer (10, A), a second type output buffer (20, B), a first type output buffer (10, A), a second type output buffer (20, B), and a first type output buffer (10, A) are sequentially arranged.

That is, in the vertical 2-dot inversion driving method, first type output buffers (10, A) and second type output buffers (20, B) are alternately arranged in units of a row. The first type output buffers (10, A) and the second type output buffers (20, B) are arranged in units of a column so that output buffers with types opposite to those of a previous column are arranged.

Figure 12:
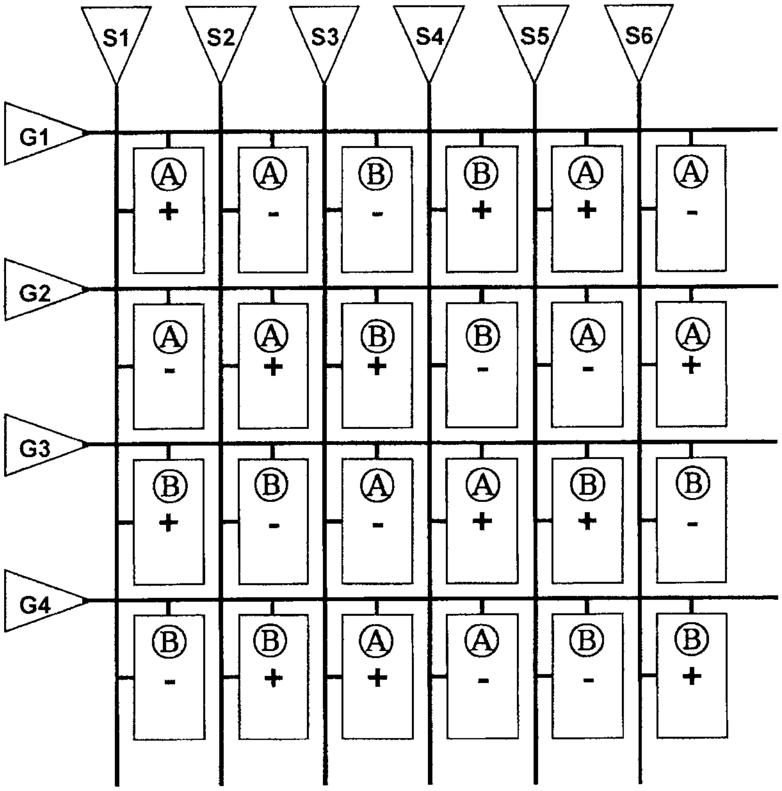
FIG. 12 illustrates a method of removing offsets in a horizontal 2-dot inversion driving method according to a fifth embodiment of the present invention.

FIG. 12 illustrates a method of removing offsets in a horizontal 2-dot inversion driving method according to a fifth embodiment of the present invention. Referring to FIG. 12, in the horizontal 2-dot inversion driving method, in first and second rows, a first type output buffer (10, A), a first type output buffer (10, A), a second type output buffer (20, B), a second type output buffer (20, B), a first type output buffer (10, A), and a first type output buffer (10, A) are sequentially arranged. In third and fourth rows, a second type output buffer (20, B), a second type output buffer (20, B), a first type output buffer (10, A), a first type output buffer (10, A), a second type output buffer (20, B), and a second type output buffer (20, B) are sequentially arranged. Similarly to the first and second rows, in fifth and sixth rows (not shown), a first type output buffer (10, A), a first type output buffer (10, A), a second type output buffer (20, B), a second type output buffer (20, B), a first type output buffer (10, A), and a first type output buffer (10, A) are sequentially arranged.

That is, in the vertical 2-dot inversion driving method, a first type output buffer (10, A) and a second type output buffer (20, B) are alternately arranged in units of two rows. The first type output buffer (10, A) and the second type output buffer (20, B) are alternately arranged in units of two columns so that output buffers with types opposite to those of previous two columns are arranged.

Figure 13:
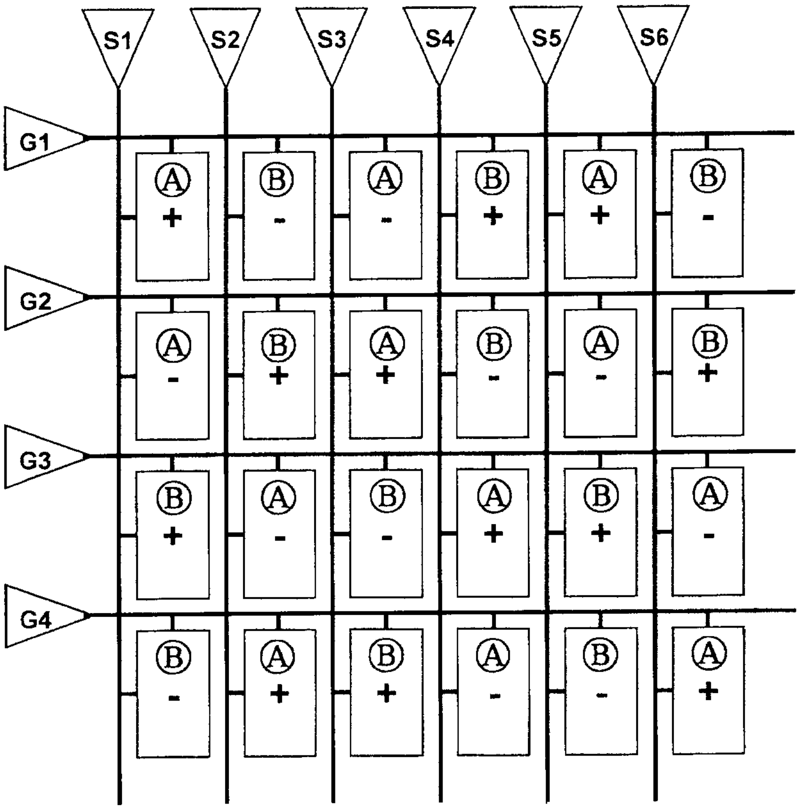
FIG. 13 illustrates a method of removing offsets in a horizontal 2-dot inversion driving method according to a six embodiment of the present invention.

FIG. 13 illustrates a method of removing offsets in a horizontal 2-dot inversion driving method according to a six embodiment of the present invention. Referring to FIG. 13, in the horizontal 2-dot inversion driving method, in first and second rows, a first type output buffer (10, A), a second type output buffer (20, B), a first type output buffer (10, A), a second type output buffer (20, B), and a first type output buffer (10, A), a second type output buffer (20, B) are sequentially arranged. In third and fourth row, a second type output buffer (20, B), a first type output buffer (10, A), a second type output buffer (20, B), a first type output buffer (10, A), a second type output buffer (20, B), and a first type output buffer (10, A) are sequentially arranged. Similarly to the first and second rows, in fifth and sixth rows (not shown), a first type output buffer (10, A), a second type output buffer (20, B), a first type output buffer (10, A), a second type output buffer (20, B), a first type output buffer (10, A), and a second type output buffer (20, B) are sequentially arranged.

That is, in the horizontal 2-dot inversion driving method, first type output buffers (10, A) and second type output buffers (20, B) are alternately arranged in units of two rows. The first type output buffers (10, A) and the second type output buffers (20, B) are alternately arrange in units of a column so that output buffers with type opposite to those of a previous column are arranged.

Figure 14:
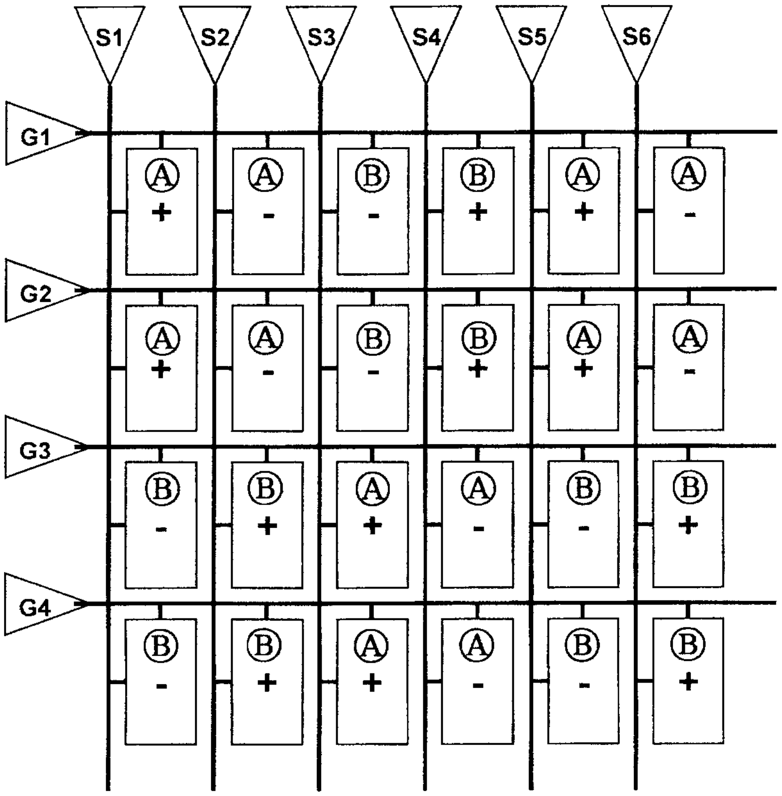
FIG. 14 illustrates a method of removing offsets in a square inversion driving method according to a seventh embodiment of the present invention.

FIG. 14 illustrates a method of removing offsets in a square inversion driving method according to a seventh embodiment of the present invention. Referring to FIG. 14, in the square inversion driving method, in first and second row, a first type output buffer (10, A), a first type output buffer (10, A), a second type output buffer (20, B), a second type output buffer (20, B), a first type output buffer (10, A), and a first type output buffer (10, A) are sequentially arranged. In third and fourth rows, a second type output buffer (20, B), a second type output buffer (20, B), a first type output buffer (10, A), a first type output buffer (10, A), a second type output buffer (20, B), and a second type output buffer (20, B) are sequentially arranged. Similarly to the first and second rows, in fifth and sixth rows (not shown), a first type output buffer (10, A), a first type output buffer (10, A), a second type output buffer (20, B), a second type output buffer (20, B), a first type output buffer (10, A), and a first type output buffer (10, A) are sequentially arranged.

That is, in the square inversion driving method, first type output buffers (10, A) and second type output buffers (20, B) are alternately arranged in units of two rows. The first type output buffers (10, A) and the second type output buffers (20, B) are alternately arranged in units of two columns so that output buffers with types opposite to those of previous two columns are arranged.

Figure 15:
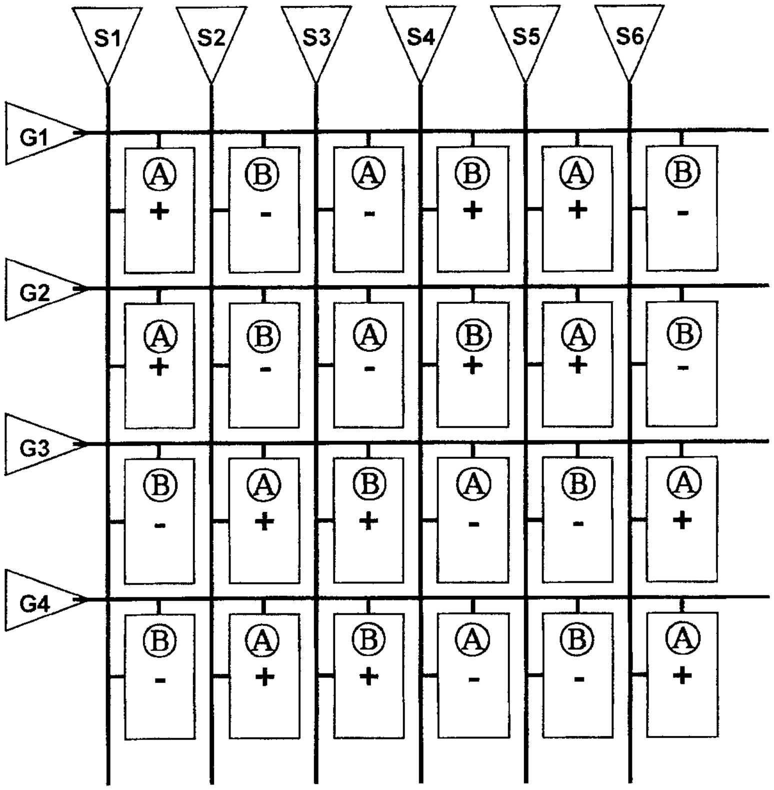
FIG. 15 illustrates a method of removing offsets in a square inversion driving method according to an eighth embodiment of the present invention.

FIG. 15 illustrates a method of removing offsets in a square inversion driving method according to an eighth embodiment of the present invention. Referring to FIG. 15, in the square inversion driving method, in first and second rows, a first type output buffer (10, A), a second type output buffer (20, B), a first type output buffer (10, A), a second type output buffer (20, B), a first type output buffer (10, A), and a second type output buffer (20, B) are sequentially arranged. In third and fourth rows, a second type output buffer (20, B), a first type output buffer (10, A), a second type output buffer (20, B), a first type output buffer (10, A), a second type output buffer (20, B), and a first type output buffer (10, A) are sequentially arranged. Similarly to the first and second rows, in fifth and sixth rows (not shown), a first type output buffer (10, A), a second type output buffer (20, B), a first type output buffer (10, A), a second type output buffer (20, B), a first type output buffer (10, A), and a second type output buffer (20, B) are sequentially arranged.

That is, in the square inversion driving method, first type output buffers (10, A) and second type output buffers (20, B) are alternately arranged in units of two rows. The first type output buffers (10, A) and the second type output buffers (20, B) are alternately arranged in units of a column so that output buffers with types opposite to those of a previous column are arranged.

Accordingly, in the method of arranging output buffers according to an embodiment of the present invention, offsets between channels are horizontally and vertically compensated at the same time.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method of removing offsets between channels of a liquid crystal panel including pixels arranged in rows and columns, the method comprising:

alternately arranging first type output buffers and second type output buffers for driving the pixels in units of at least two rows of the pixels; and arranging the first type output buffers and the second type output buffers in units of at least two columns of the pixels so that the output buffers with types opposite to those of previous two columns are arranged;

wherein the first and second type output buffers are constructed with differential transistors that constitute a symmetrical structure and load transistors connected to the differential transistors, and wherein the second type output buffers are embodied by switching connections among the differential transistors and connections among the load transistors in the first type output buffers.

2. The method of claim 1, wherein the liquid crystal panel is driven in a vertical 1-dot inversion driving method so that a vertically neighboring pixel is displayed with inverse polarity.

3. The method of claim 1, wherein the liquid crystal panel is driven in a vertical 2-dot inversion driving method so that two vertically neighboring pixels are displayed with inverse polarity.

4. The method of claim 1, wherein the liquid crystal panel is driven in a horizontal 2-dot inversion driving method so that two horizontally neighboring pixels are displayed with inverse polarity.

5. The method of claim 1, wherein the liquid crystal panel is driven in a square inversion driving method so that a neighboring group including horizontally neighboring two pixels and vertically neighboring two pixels is displayed with inverse polarity.

6. A method of removing offsets between channels of a liquid crystal panel including pixels arranged in rows and columns, the method comprising:

alternately arranging first type output buffers and second type output buffers for driving the pixels in units of at least two rows of the pixels; and arranging the first type output buffers and the second type output buffers in units of a column of the pixels so that the output buffers with types opposite to those of previous two columns are arranged;

wherein the first and second type output buffers are constructed with differential transistors that constitute a symmetrical structure and load transistors connected to the differential transistors, and wherein the second type output buffers are embodied by switching connections among the differential transistors and connections among the load transistors in the first type output buffers.

7. The method of claim 6, wherein the liquid crystal panel is driven in a vertical 1-dot inversion driving method so that a vertically neighboring pixel is displayed with inverse polarity.

8. The method of claim 6, wherein the liquid crystal panel is driven in a vertical 2-dot inversion driving method so that two vertically neighboring pixels are displayed with inverse polarity.

9. The method of claim 6, wherein the liquid crystal panel is driven in a horizontal 2-dot inversion driving method so that two horizontally neighboring pixels are displayed with inverse polarity.

10. The method of claim 6, wherein the liquid crystal panel is driven in a square inversion driving method so that a neighboring group including horizontally neighboring two pixels and vertically neighboring two pixels is displayed with inverse polarity.

11. A method of removing offsets between channels of a liquid crystal panel including pixels arranged in rows and columns, the method comprising:

alternately arranging first type output buffers and second type output buffers for driving the pixels in units of a row of the pixels; and arranging the first type output buffers and the second type output buffers in units of at least two columns of the pixels so that the output buffers with types opposite to those of previous two columns are arranged;

wherein the first and second type output buffers are constructed with differential transistors that constitute a symmetrical structure and load transistors connected to the differential transistors, and wherein the second type output buffers are embodied by switching connections among the differential transistors and connections among the load transistors in the first type output buffers.

12. The method of claim 11, wherein the liquid crystal panel is driven in a vertical 1-dot inversion driving method so that a vertically neighboring pixel is displayed with inverse polarity.

13. The method of claim 11, wherein the liquid crystal panel is driven in a vertical 2-dot inversion driving method so that two vertically neighboring pixels are displayed with inverse polarity.

14. The method of claim 11, wherein the liquid crystal panel is driven in a horizontal 2-dot inversion driving method so that two horizontally neighboring pixels are displayed with inverse polarity.

15. The method of claim 11, wherein the liquid crystal panel is driven in a square inversion driving method so that a neighboring group including horizontally neighboring two pixels and vertically neighboring two pixels is displayed with inverse polarity.

16. A method of removing offsets between channels of a liquid crystal panel including pixels arranged in rows and columns, the method comprising:

alternately arranging first type output buffers and second type output buffers for driving the pixels in units of a row of the pixels; and arranging the first type output buffers and the second type output buffers in units of a column of the pixels so that the output buffers with types opposite to those of a previous column are arranged;

wherein the first and second type output buffers are constructed with differential transistors that constitute a symmetrical structure and load transistors connected to the differential transistors, and wherein the second type output buffers are embodied by switching connections among the differential transistors and connections among the load transistors in the first type output buffers.

17. The method of claim 16, wherein the liquid crystal panel is driven in a vertical 1-dot inversion driving method so that a vertically neighboring pixel is displayed with inverse polarity.

18. The method of claim 16, wherein the liquid crystal panel is driven in a vertical 2-dot inversion driving method so that two vertically neighboring pixels are displayed with inverse polarity.

19. The method of claim 16, wherein the liquid crystal panel is driven in a horizontal 2-dot inversion driving method so that two horizontally neighboring pixels are displayed with inverse polarity.

20. The method of claim 16, wherein the liquid crystal panel is driven in a square inversion driving method so that a neighboring group including horizontally neighboring two pixels and vertically neighboring two pixels is displayed with inverse polarity.

21. A method of removing offsets between channels of a liquid crystal panel including pixels arranged in rows and columns, the method comprising:

alternately arranging first type output buffers and second type output buffers for driving the pixels in units of at least two rows of the pixels; and arranging the first type output buffers and the second type output buffers in units of at least two columns of the pixels so that the output buffers with types opposite to those of previous two columns are arranged wherein the liquid crystal panel is driven in a method selected from the group consisting of:

a vertical 1-dot inversion driving method so that a vertically neighboring pixel is displayed with inverse polarity;

a vertical 2-dot inversion driving method so that two vertically neighboring pixels are displayed with inverse polarity;

a horizontal 2-dot inversion driving method so that two horizontally neighboring pixels are displayed with inverse polarity; and a square inversion driving method so that a neighboring group including horizontally neighboring two pixels and vertically neighboring two pixels is displayed with inverse polarity.

22. The method of claim 21, wherein the first and second type output buffers are constructed with differential transistors that constitute a symmetrical structure and load transistors connected to the differential transistors, and wherein the second type output buffers are embodied by switching connections among the differential transistors and connections among the load transistors in the first type output buffers.

* * * * *